Sept. 14, 1948.  G. RAIMONDI  2,449,320
LAND AND WATER VEHICLE
Filed Nov. 30, 1944  7 Sheets-Sheet 1
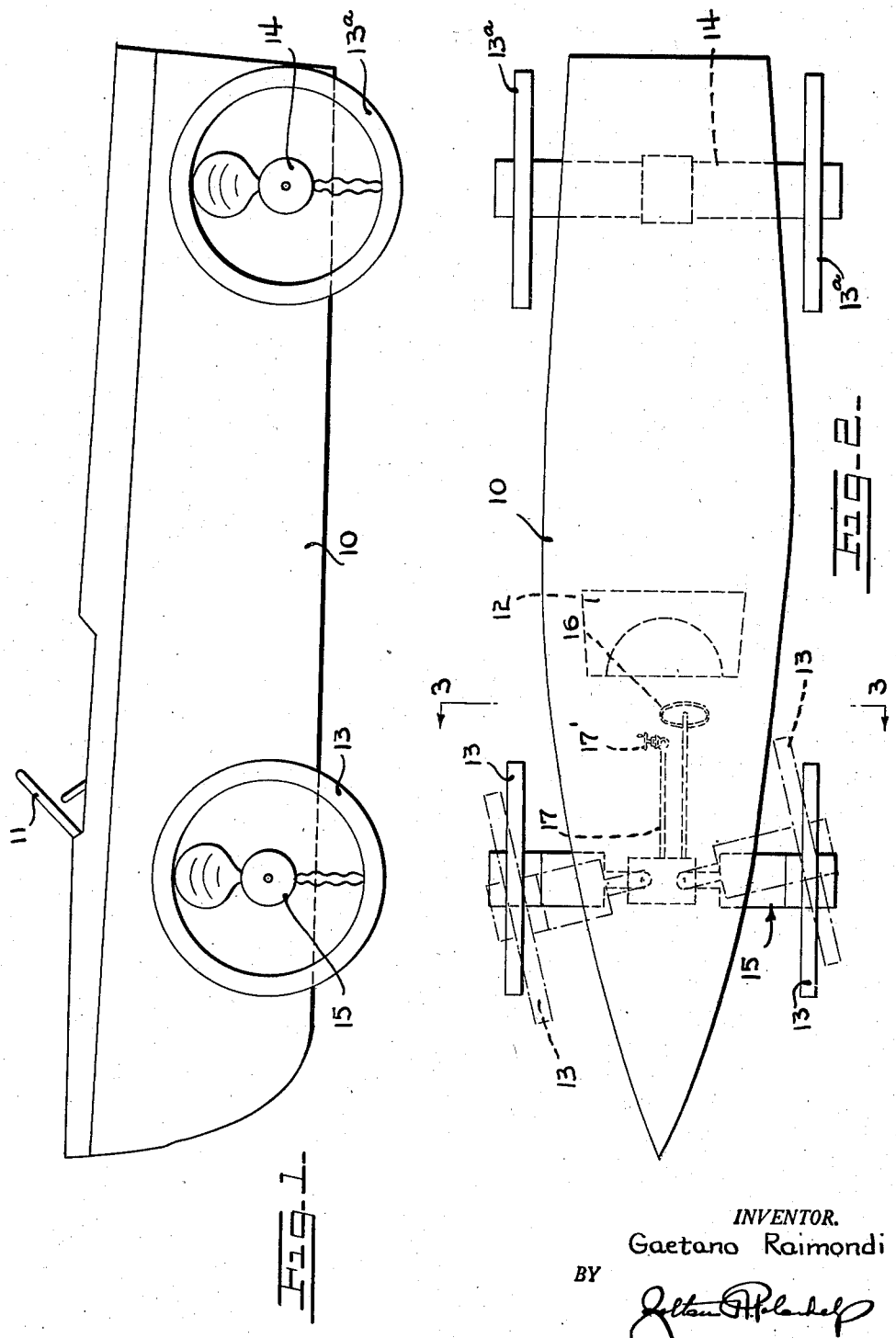
INVENTOR.
Gaetano Raimondi
BY
ATTORNEY.

Sept. 14, 1948.     G. RAIMONDI     2,449,320
LAND AND WATER VEHICLE
Filed Nov. 30, 1944     7 Sheets-Sheet 2
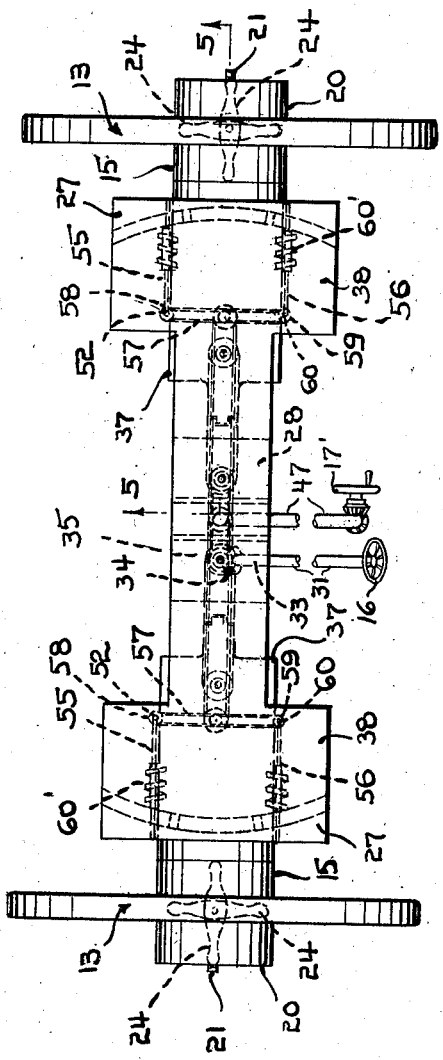
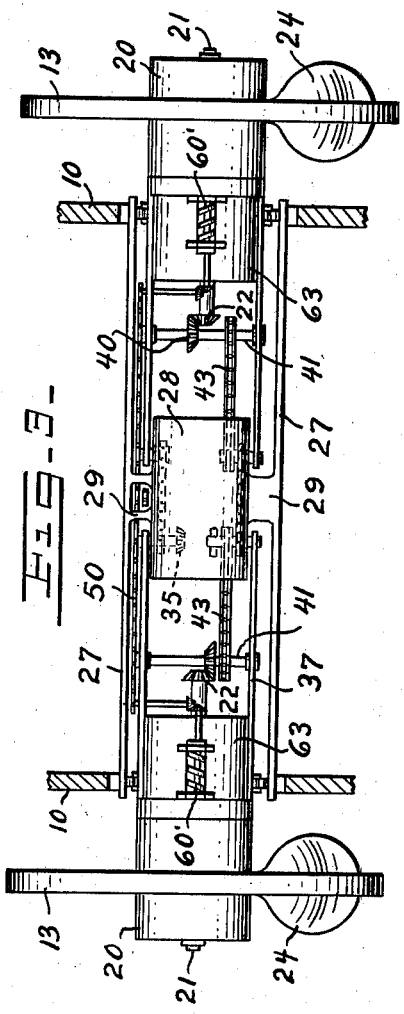
INVENTOR.
Gaetano Raimondi
BY
ATTORNEY.

Sept. 14, 1948.  G. RAIMONDI  2,449,320
LAND AND WATER VEHICLE
Filed Nov. 30, 1944  7 Sheets-Sheet 3
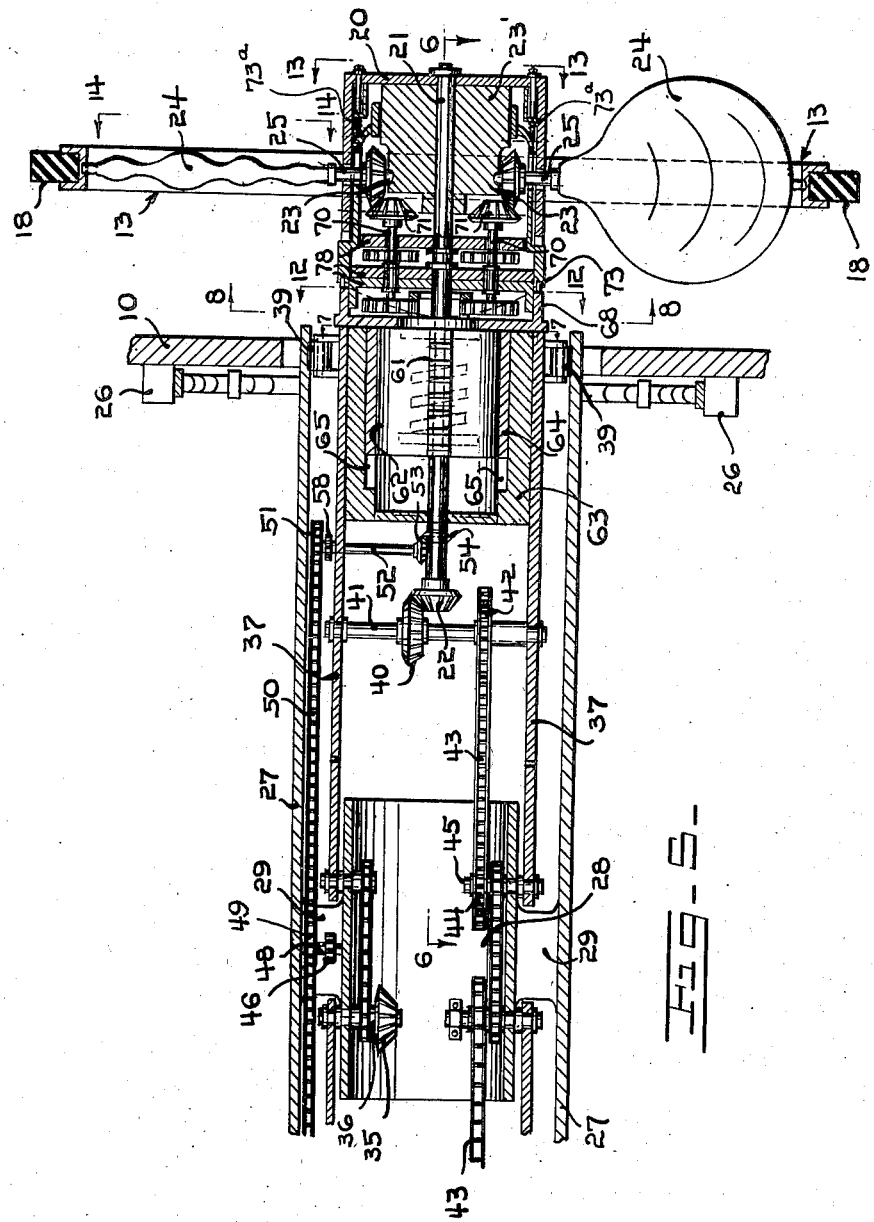
INVENTOR.
Gaetano Raimondi
BY
ATTORNEY.

Sept. 14, 1948.                G. RAIMONDI                 2,449,320
                          LAND AND WATER VEHICLE
Filed Nov. 30, 1944                                  7 Sheets-Sheet 4
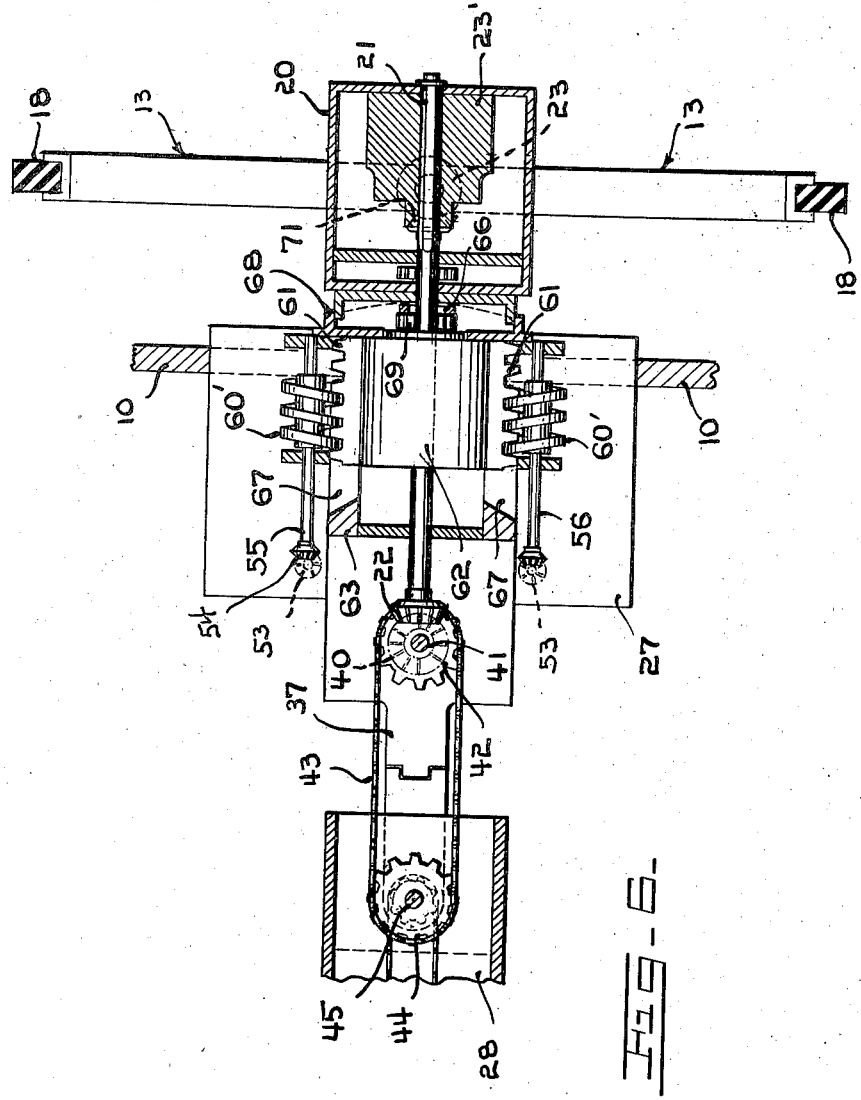
INVENTOR.
Gaetano Raimondi
BY
ATTORNEY.

Sept. 14, 1948.　　　　G. RAIMONDI　　　　2,449,320
LAND AND WATER VEHICLE
Filed Nov. 30, 1944　　　　　　　　　　　　7 Sheets-Sheet 5
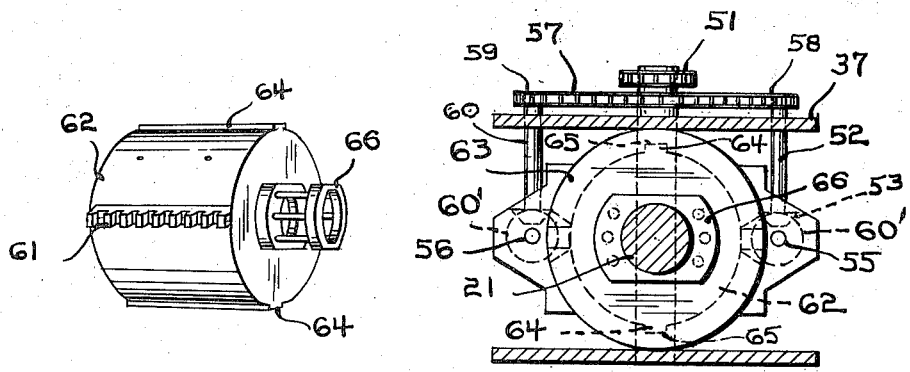
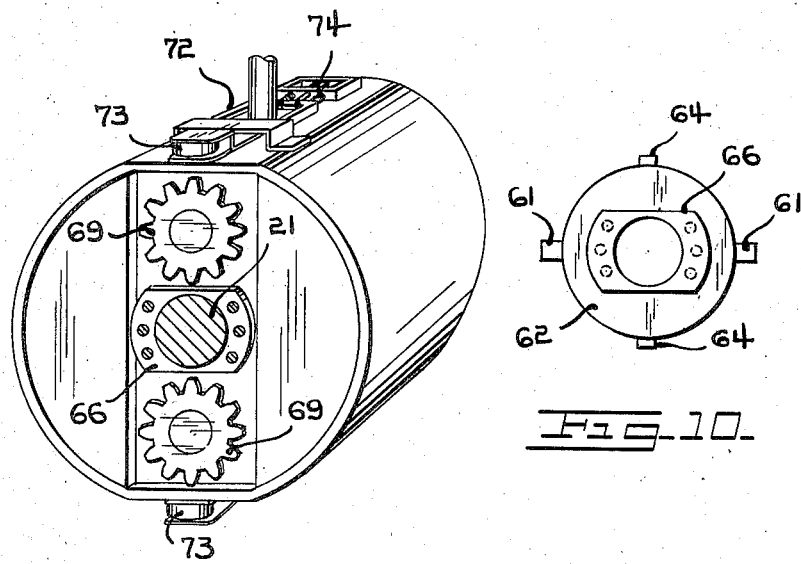
INVENTOR.
Gaetano Raimondi
BY
ATTORNEY.

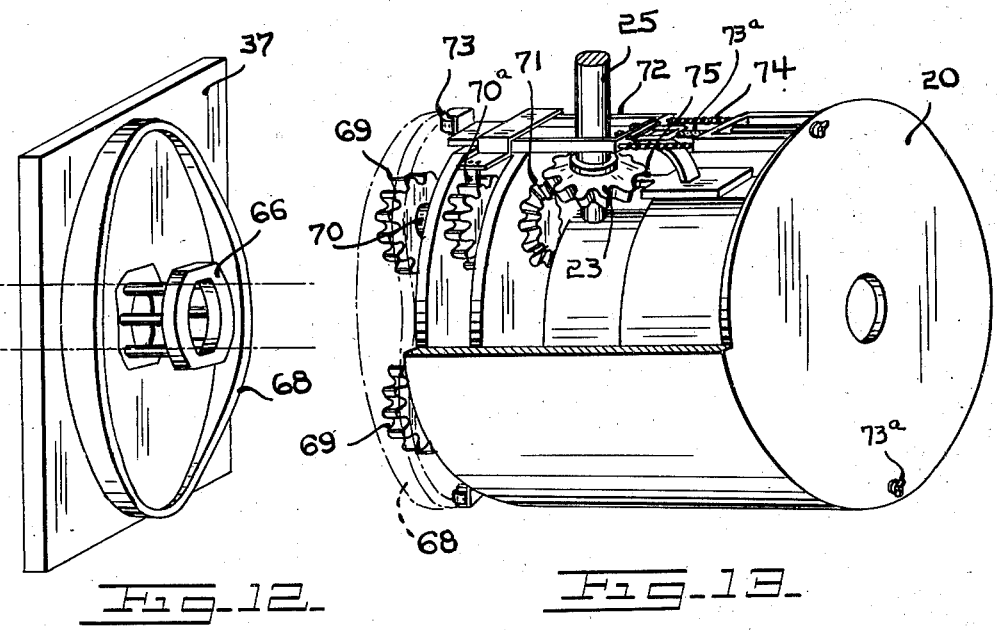
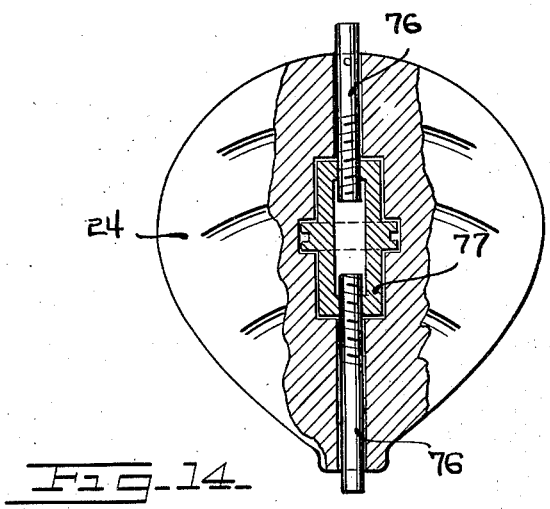

Patented Sept. 14, 1948

2,449,320

UNITED STATES PATENT OFFICE 2,449,320

LAND AND WATER VEHICLE

Gaetano Raimondi, New York, N. Y.

Application November 30, 1944, Serial No. 565,865

8 Claims. (Cl. 115—1)

1

This invention relates to new and useful improvements in a vehicle adapted to be used for land and water transportation, and for easy and pleasant travelling in either element.

More specifically, the present invention proposes the construction of a vehicle having four wheels for running on land, each of the wheels having two opposed paddles for providing locomotion in water.

Still further it is proposed to provide a vehicle as aforesaid having driving mechanism for the paddles arranged for intermittent rotation so that while the upper paddles of each wheel are idle, the other paddles (in the bottom) do the propulsion in the water.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevation of a vehicle constructed in accordance with this invention.

Fig. 2 is a bottom plan view of the vehicle, the front wheels being indicated in turned position in dot and dash lines.

Fig. 3 is an enlarged section on the line 3—3 of Fig. 2.

Fig. 4 is an enlarged plan view of the front wheel and paddle assembly of the vehicle.

Fig. 5 is an enlarged section on the line 5—5 of Fig. 4, parts being shown in full.

Fig. 6 is a section on the line 6—6 of Fig. 5.

Fig. 7 is a section on the line 7—7 of Fig. 5.

Fig. 8 is an enlarged perspective view taken on the line 8—8 of Fig. 5.

Fig. 9 is a perspective view of a drive cylinder forming part of the driving mechanism of the vehicle.

Fig. 10 is a front elevation of the cylinder of Fig. 9, viewed from the right thereof.

Fig. 12 is an enlarged perspective view, taken on the line 12—12 of Fig. 5.

Fig. 13 is an enlarged perspective view, partly in section, taken on the line 13—13 of Fig. 5.

Fig. 14 is an enlarged elevation of a paddle, partly in section, as viewed on the line 14—14 of Fig. 5.

Figure 11:
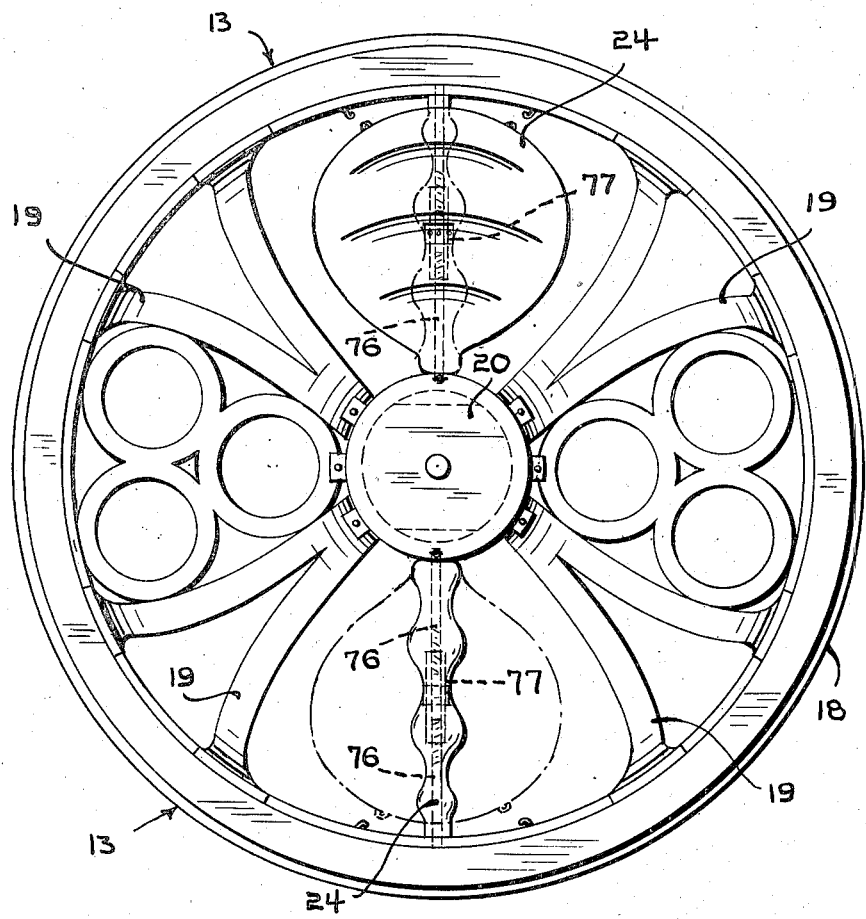
Fig. 11 is an enlarged front elevation of the wheel and paddle device of the vehicle.

The present invention is directed toward providing a vehicle which may be driven on land

2 like an automobile and in the water. On land, it runs on four wheels, and in the water it is driven by eight paddles, mounted two on each wheel in such a way that they do not interfere with the wheels when running on land. The paddles drive by rotation about the wheel axis, and further rotate about an axis perpendicular to the wheel axis to automatically fall into streamline alignment with the wheel when not driving. The invention has broad application to amphibious vehicles, but is shown in the drawings, by way of example, to a combined automobile-boat construction.

The amphibian vehicle, according to this invention, includes a hull 10 conforming in shape to conventional motor boat lines. This hull also constitutes the automobile body when the vehicle is running on land. It includes a windshield 11 and a seat 12. It also will have an engine placed in the best position for equilibrium of the vehicle and will have other desirable furnishings and equipment.

The vehicle has two front wheels 13 and two rear wheels 13$^a$. The rear wheels 13$^a$ are driven from a rear driving mechanism 14 and the front wheels are driven from a front driving mechanism 15. The front wheels 13 can turn in the fashion of conventional automobile wheels. The rear wheels can not be steered. A steering wheel 16 is provided for turning the front wheels and a control 17 is provided for opening and closing a clutch, as will presently appear.

The power providing mechanism of the vehicle is not shown, as this may be of any well-known type with slight modification. For instance, there may be an internal combustion engine of the usual automobile type. However, each of the four wheels has its own drive and therefore the internal combustion engine will be connected for driving the four wheels. For instance, the usual drive rod extending from the engine longitudinally of the vehicle will be provided, with gears on this drive rod for driving the front wheels and other gears for driving the rear wheels. The drive rod will have the usual universal joint and other construction. The present invention is directed toward the drive mechanism for each wheel and toward the steering mechanism for the front wheels.

The wheels 13 and 13$^a$ are identical and one is best shown in Fig. 11. Each wheel has a hard rubber tire 18 supported by spokes 19. These spokes are connected to a hollow drum 20, shown in Figs. 5 and 11, which is a front wheel drive assemblage. A shaft or axle 21 is secured to this drum and extends inwardly therefrom, having a miter gear 22 at its inner end. The portion of the shaft in the drum is hexagonal and a block 23′ is secured thereon. Two opposed miter gears 23 are mounted in this block, each secured to a paddle 24, each gear 23 having a shaft 25 forming a stem of the paddle. Each paddle is journalled at its outer end in the rim of the wheel adjacent the rubber tire 18. The paddles are in a diametral plane of the wheel and are adapted to be disposed in the plane of the wheel when the vehicle is on land and to be locked in this position by chains secured to hooks on the rim. When in water, the paddles rotate with the shafts 25 and they are synchronized so that the top paddle will be in the plane of the wheel, streamlining the top paddle so that it offers no water resistance while the bottom paddle will be at right angles thereto and will form the motive device for driving the boat. As the bottom paddle travels upwardly, it will rotate until it gets into the plane of the wheel and as the top paddle travels downwardly it will rotate until it gets into a plane at right angles to the plane of the wheel.

The hull (chassis) 10 is mounted by springs 26 to a housing 27 extending transversely of the hull 10. At the center of this housing there is a housing 28 connected to the housing 27 by webs 29. Steering wheel 16 has a shaft 31 with a portion 33 in housing 28 (see Fig. 4) having a miter gear 34 at its inner end which drives a miter gear 35 which turns a shaft 36 journalled in housing 28. Shaft 36 is connected to one end of a long casing 37 extended in the housing 27. Housing 27 terminates at each of its ends in a large box 38 permitting the casings 37 to swing about pivots at their inner ends. One of these pivots is the shaft 36 and the other pivots are other shafts similar to shaft 36. The two top shafts are connected by a chain drive and the two bottom shafts are connected by a chain drive, see Fig. 5. Rollers 39 secured to the top and bottom walls of casings 37 rollably support the outer ends of casings 37 in boxes 38. When casings 37 pivot, the wheels turn, as the wheels are rotatably mounted on the casings, as will presently appear. Thus the front wheels can be turned by the steering wheel 16 in much the same manner as the front wheels of an automobile can be turned. The rear wheels do not have this steering mechanism as they, similar to automobile wheels, can not be steered.

The drive for rotating the front wheels will now be described. As aforesaid, the wheels include a hub or drum 20 which is mounted on the shaft 21 having a miter gear 22 at its inner end. Rotation of this shaft will rotate the wheel. This shaft may be driven in any desired manner and connected up with an internal combustion engine of the vehicle in any desired manner. The shaft 21 is shown in Fig. 5 geared, by means of its gear 22 to a miter gear 40, on the shaft 41 journalled in casing 37 and therefore adapted to move therewith so that the wheels are rotated even when in a turned position. Shaft 41 has a sprocket 42 connected by a chain 43 to a sprocket 44 on a shaft 45 journalled in housing 28. This shaft 45 will be the shaft connected up with the source of power. As may be seen, shaft 45 is in the same axial position as the adjacent bottom shaft 36 and therefore shaft 36 is loosely mounted (telescoped) on shaft 45. There are four shafts 36, the vertically aligned pairs each forming a pivot for the correlated casing 37. While only one shaft 45 has been described it will be understood that there is a shaft 45 on each side of the longitudinal center line of the vehicle.

The usual clutch, transmission etc. will be provided for connecting shafts 45 with the internal combustion engine. Each of the rear wheels are similar to the front wheels and have the paddles 24, the drum 20, the shaft 21 and the mechanism connecting up shaft 21 with rear drive shafts 45. Therefore no further description thereof is deemed necessary.

There remains to be described the operating mechanism for the paddles. All eight paddles are controlled from the same source, which is the control 17. This control has a wheel 17′ which, when rotated, turns a gear 46, the wheel being geared (not shown) to a rod 47 geared to gear 46. Gear 46 is mounted on a shaft 48 having sprocket 49 connected by a chain 50 to two sprockets 51, one for each casing 37. In other words, sprocket 49 is midway between sprockets 51 and is secured thereto by a common chain.

Sprockets 51 are each secured on a shaft 52. Each shaft 52 has a miter gear 53 at its bottom in mesh with a miter gear 54 of a worm shaft 55. Worm shaft 55 is at one side of the shaft 21 and similar worm shaft 56 is at the other side. This shaft 56 is driven from shaft 52 by a chain 57 connecting a sprocket 58 on a shaft 52 and a sprocket 59 on a shaft 60 geared by bevel gears to shaft 56.

Worms 60′ are mounted on shafts 55 and 56, and each meshes with a rack 61 formed on the outside of a cylinder 62 mounted in a housing 63 secured in casing 37, shaft 21 passing through cylinder 62. Cylinder 62 is best shown in Fig. 9. It has oil holes and top and bottom longitudinal tongues 64 sliding in grooves 65 formed in the housing 63. A lantern gear 66 is secured to the front end of cylinder 62. The racks 61 of the cylinder extend through slots 67 in the housing 63.

Casing 37 has a front wall provided with a cam 68, best shown in Fig. 12. Rotation of control wheel 17′ when the mechanism is in the position shown in Fig. 5, rotates the worms 60′, drawing the cylinder 62 inwardly and pulling the lantern gear out of mesh with gears 69 (see Fig. 8) which it drives. The gears 69 are each secured to a shaft 70 which has a key way for synchronizing the gears mounted on it and each shaft 70 has a miter gear 71 in engagement with one of the paddle gears 23. Thus as the wheels rotate, gears 69 run around the lantern gears, turning the paddles, but when the lantern gears are disengaged from the gears 69, rotation of the wheels does not affect rotation of the paddles. Consequently, the lantern gears and gears 69 will be in mesh in water and out of mesh on land, the lantern gear forming a clutch. Rotation of the wheels also rotates the drum 20 relative to the cam 68. Each drum 20 has a slide 72 mounted on its top and bottom faces, which are flat. Each slide has a roller 73 engaging the cam and springs 74 urging the roller into such engagement. A dog 75 is connected to each slide and each dog is adapted to coact with a gear 23 so that when the rollers ride on the cam low parts, the dogs engage the gears and lock them but when the rollers ride on the high part, the dogs are disengaged from the gears 23. A wing nut bolt 73ª, passing through the outer face of the drum 20, may be employed for holding the springs 74 compressed and the roller 73 in neutral or inoperative position, the wing nut bolt controlling a fork for retracting the slide. Each of the paddles has a two part center shaft 76 (Fig. 14) connected by a turnbuckle 11, enabling the paddles to be assembled in the spokes of the wheel.

Gears 70a are also provided on shafts 70 and these gears 70a of each drive will be in mesh with an idler gear (not shown) which holds the two adjacent shafts 70 from rotating out of their correct relative position. The cam 68 has a single high part, which is designed to alternately unlock the dogs, so that the paddles will be alternately shifted to propelling position and out of propelling position.

The operation of the vehicle, in summary, is as follows:

The wheels rotate and the front wheels turn in the same manner on land and in the water. The only difference between operation of the vehicle in the water over its operation on land is that the paddles are brought into operation.

On land, the vehicle is driven similar to any automobile. That is, the engine is started and the shafts 45 are rotated as aforesaid, thereby rotating the shafts 41 and 21, and thereby rotating the wheels. When it is desired to turn the front wheels, the steering wheel 16 is turned, turning gear 35 and thereby the shafts 36, thereby pivoting the casings 37. As the casings 37 swing, the wheels turn, as the wheels are secured to the outer ends of the casings 37.

When the vehicle is to travel in water, some preparation must be made first. That is, while on land, the paddles are held from turning as by chaining them to the spokes or rim of the wheels, and therefore the paddles must be unchained. Also the lantern gears are not operative on land and they must be meshed with the gears. This is done by turning the control wheel 17', rotating shaft 17 and thereby gear 46. The description of the various apparatus brought into play by turning the gear 46 has already been covered in detail, with the successive steps that take place in order to move the lantern gears into or out of mesh with their gears 69. The lantern gears are stationary and the wheels rotating with the gears 69 in mesh with the stationary lantern gears effects rotation of the gears 69 and turning of the paddles. The locomotion produced by the paddles is of course, produced by the rotation of the wheels. The lantern gear only controls rotation of the paddles around their axes.

Before the vehicle descends into the water it is imperative that the operator stop the vehicle as the paddles are all in the line of the wheels. The chains must be removed and the paddles moved to their correct position, the wing nut and fork being employed. The paddles are arranged so that the uppermost are in the line of the wheels and the lowermost are transverse of the wheels.

The foregoing description of the structure of the vehicle embodying the present invention has been somewhat brief, only those parts essential to a full understanding of the invention having been described in detail. The drawings are somewhat diagrammatic, showing only sufficient of the structure to illustrate the present invention, which, as aforesaid, is the driving mechanism and the steering mechanism. It will be understood, as aforesaid, that the mechanism shown in the figures will be connected up with an internal combustion engine and a longitudinal drive shaft in any desired and well-known manner, no showing of the structure or description thereof being deemed necessary.

Furthermore, only the mechanism associated with the front wheels has been described, the mechanism for the rear wheels being essentially the same but changed slightly due to the fact that no steering mechanism is needed. This rear mechanism has not been shown or described as it would be largely a repetition of the drawings and description of the front wheel mechanism.

In the foregoing description, a detailed description of bearings, bearing supports and other similar parts have not been given. Similarly the method of assembling or fabricating the various parts has not been described. Referring to Fig. 5 which is somewhat diagrammatic, it will be seen that many parts have been omitted which would actually be employed in a finished structure. For instance, the hub, casing and housings would be made watertight by appropriate plates and packing. Also the means preventing the shafts or axles 21 from moving laterally outward have not been shown, any suitable retaining means being applicable. The shafts 70 are shown in Fig. 5 mounted in three plates, indicated by the number 78. These plates have not been described as their function is obvious in the drawings. Furthermore, clearances, spaces, and other provisions for sliding and turning of the various parts has not been gone into in detail, it being obvious that those parts that are movable or slidable are disposed in quarters arranged to permit such sliding or movement.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An amphibian vehicle for use on both land and in the water comprising a hull, two front and two rear wheels secured to said hull, each having a hub, a tire, spokes securing said tire to said hub, and a paddle journalled to said hub and tire and disposed between two adjacent spokes, and separate driving mechanisms for rotating each of said wheels and its paddle, and separate driving mechanisms for rotating each of said paddles about its axis perpendicular to the axis of its wheel, including gears in the hub of its said wheel and a stationary lantern gear with which said gears mesh, and a clutch for moving each of said lantern gears out of mesh with its correlated hub gears.

2. An amphibian vehicle for use on both land and in the water comprising a hull, two front wheels connected to said hull, two rear wheels connected to said hull, each of said front wheels having a tire, a hub, spokes connecting said tire and hub, and two opposed paddles journalled to said tire and hub, in a diametrical plane perpendicular to the axis of said wheel, said paddles being bodily rotatable with said wheel and rotatable about an axis perpendicular to said wheel axis, and driving and steering mechanism for said front wheels, including a transverse housing spanning the sides of said hull, a central housing rigidly secured in said transverse housing, two casings extending in opposite directions from said central housing and each pivotally secured at its inner end to the adjacent end of said central housing and connected at its opposite end to the adjacent of said front wheels, a steering wheel geared to said casings for pivoting same for turning said front wheels, drive shafts journalled in said casings, and connected to said wheels for rotating same, and means gearing said paddles to said drive shafts for rotating said paddles about said perpendicular axes.

3. An amphibian vehicle for use on both land and in the water comprising a hull, two front wheels connected to said hull, two rear wheels connected to said hull, each of said front wheels having a tire, a hub, spokes connecting said tire and hub, and two opposed paddles journalled to said tire and hub in a diametrical plane perpendicular to the axis of said wheel, said paddles being bodily rotatable with said wheel and rotatable about an axis perpendicular to said wheel axis, and driving and steering mechanism for said front wheels, including a transverse housing spanning the sides of said hull, a central housing rigidly secured in said transverse housing, two casings extending in opposite directions from said central housing and each pivotally secured at its inner end to the adjacent end of said central housing and connected at its opposite end to the adjacent of said front wheels, a steering wheel geared to said casings for pivoting same for turning said front wheels, drive shafts journalled in said casings and connected to said wheels for rotating same, and means for rotating said paddles about said perpendicular axes, including a lantern gear in each of said casings and a gear train connecting each of said paddles with the adjacent lantern gear.

4. An amphibian vehicle for use on both land and in the water comprising a hull, two front wheels connected to said hull, two rear wheels connected to said hull, each of said front wheels having a tire, a hub, spokes connecting said tire and hub, and two opposed paddles journalled to said tire and hub in a diametrical plane perpendicular to the axis of said wheel, said paddles being bodily rotatable with said wheel and rotatable about an axis perpendicular to said wheel axis, and driving and steering mechanism for said front wheels, including a transverse housing spanning the sides of said hull, a central housing rigidly secured in said transverse housing, two casings extending in opposite directions from said central housing and each pivotally secured at its inner end to the adjacent end of said central housing and connected at its opposite end to the adjacent of said front wheels, a steering wheel geared to said casings for pivoting same for turning said front wheels, drive shafts journalled in said casings and connected to said wheels for rotating same and means for rotating said paddles about said perpendicular axes, including a lantern gear in each of said casings and a gear train connecting each of said paddles with the adjacent lantern gear, and means for withdrawing said lantern gear from engagement with its correlated paddle gear trains.

5. An amphibian vehicle for use on both land and in the water comprising a hull, two front wheels connected to said hull, two rear wheels connected to said hull, each of said front wheels having a tire, a hub, spokes connecting said tire and hub, and two opposed paddles journalled to said tire and hub in a diametrical plane perpendicular to the axis of said wheel, said paddles being bodily rotatable with said wheel and rotatable about an axis perpendicular to said wheel axis, and driving and steering mechanism for said front wheels, including a transverse housing spanning the sides of said hull, a central housing rigidly secured in said transverse housing, two casings extending in opposite directions from said central housing and each pivotally secured at its inner end to the adjacent end of said central housing and connected at its opposite end to the adjacent of said front wheels, a steering wheel geared to said casings for pivoting same for turning said front wheels, drive shafts journalled in said casings and connected to said wheels for rotating same, and means for rotating said paddles about said perpendicular axes including a cylinder mounted in each of said casings having a lantern gear, gears connected to each of said paddles, and a gear train connecting each of said paddle gears with the adjacent lantern gear.

6. An amphibian vehicle for use on both land and in the water comprising a hull, two front wheels connected to said hull, two rear wheels connected to said hull, each of said front wheels having a tire, a hub, spokes connecting said tire and hub, and two opposed paddles journalled to said tire and hub in a diametrical plane perpendicular to the axis of said wheel, said paddles being bodily rotatable with said wheel and rotatable about an axis perpendicular to said wheel axis, and driving and steering mechanism for said front wheels, including a transverse housing spanning the sides of said hull, a central housing rigidly secured in said transverse housing, two casings extending in opposite directions from said central housing and each pivotally secured at its inner end to the adjacent end of said central housing and connected at its opposite end to the adjacent of said front wheels, a steering wheel geared to said casings for pivoting same for turning said front wheels, drive shafts journalled in said casings and connected to said wheels for rotating same, and means for rotating said paddles about said perpendicular axes including a cylinder mounted in each of said casings having a lantern gear, gears connected to each of said paddles, and a gear train connecting each of said paddle gears with the adjacent lantern gear, and clutch means for moving said lantern gears out of engagement with said gear trains including worms, a control for rotating said worms and a rack on each of said cylinders for the adjacent worm.

7. An amphibian vehicle for use on both land and in the water comprising a hull, two front wheels connected to said hull, two rear wheels connected to said hull, each of said front wheels having a tire, a hub, spokes connecting said tire and hub, and two opposed paddles journalled to said tire and hub in diametrical plane perpendicular to the axis of said wheel, said paddles being bodily rotatable with said wheel and rotatable about an axis perpendicular to said wheel axis, and driving and steering mechanism for said front wheels including a transverse housing spanning the sides of said hull, a central housing rigidly secured in said transverse housing, two casings extending in opposite directions from said central housing and each pivotally secured at its inner end to the adjacent end of said central housing and connected at its opposite end to the adjacent of said front wheels, a steering wheel geared to said casings for pivoting same for turning said front wheels, drive shafts journalled in said casings and connected to said wheels for rotating same, and means for rotating said paddles about said perpendicular axes including a cylinder mounted in each of said casings having a lantern gear, gears connected to each of said paddles, and a gear train connecting each of said paddle gears with the adjacent lantern gear, and clutch means for moving said lantern gears out of engagement with said gear trains including worms, a control for rotating said worms and a rack on each of said cylinders for the adjacent worm, and means for locking said paddles against rotation about said perpendicular axes including a cam on each of said casings and a slidable dog controlled by said cam for each of said paddle gears.

8. An amphibian vehicle for use on both land and in the water comprising a hull, two front wheels connected to said hull, two rear wheels connected to said hull, each of said front wheels having a tire, a hub, spokes connecting said tire and hub, and two opposed paddles journalled to said tire and hub in a diametrical plane perpendicular to the axis of said wheel, said paddles being bodily rotatable with said wheel and rotatable about an axis perpendicular to said wheel axis, and driving and steering mechanism for said front wheels, including a transverse housing spanning the sides of said hull, a central housing rigidly secured in said transverse housing, two casings extending in opposite directions from said central housing and each pivotally secured at its inner end to the adjacent end of said central housing and connected at its opposite end to the adjacent of said front wheels, rollers on said casing engaging said transverse housing, a steering wheel geared to said casings for pivoting same for turning said front wheels, drive shafts journalled in said casings and connected to said wheels for rotating same, and means gearing said paddles to said drive shafts for rotating said paddles about said perpendicular axes.

GAETANO RAIMONDI.

REFERENCES CITED

The following references are of record in the file of this patent:

UNITED STATES PATENTS

| Number | Name | Date |
| --- | --- | --- |
| 904,998 | Richter | Nov. 24, 1908 |
| 1,752,200 | Raimondi | Mar. 25, 1930 |